United States Patent [19]

Satzler

[11] 4,207,052
[45] Jun. 10, 1980

[54] CURING MOLD FOR CURING REPLACEABLE TREAD AND TRACK BELTS

[75] Inventor: Ronald L. Satzler, Princeville, Ill.

[73] Assignee: Caterpillar Tractor Co., Peoria, Ill.

[21] Appl. No.: 13,356

[22] Filed: Feb. 16, 1979

Related U.S. Application Data

[63] Continuation of Ser. No. 895,887, Apr. 13, 1978, abandoned, which is a continuation of Ser. No. 705,843, Jul. 16, 1976, abandoned.

[51] Int. Cl.$^2$ .................... B29D 29/00; B29C 5/00
[52] U.S. Cl. .................... 425/394; 425/28 B;
425/403; 249/142; 249/180; 249/184
[58] Field of Search ............ 425/23, 28 B, 34 B,
425/39, 40, 32, 123, 394, 393; 249/178, 179,
180, 181, 182, 183, 184, 185, 142, 144, 186

[56] References Cited

U.S. PATENT DOCUMENTS

| | | | |
|---|---|---|---|
| 733,313 | 7/1903 | Cramer | 249/186 X |
| 1,016,284 | 2/1912 | Meek et al. | 249/180 |
| 1,167,009 | 1/1916 | Nall | 425/40 |
| 2,730,783 | 1/1956 | Kennison | 425/123 X |
| 3,358,330 | 12/1967 | Pacciarini et al. | 425/39 |
| 3,497,174 | 2/1970 | Nagagam | 249/183 X |
| 3,729,282 | 4/1973 | Hester et al. | 425/393 |
| 3,825,392 | 7/1974 | Ligon et al. | 249/184 X |
| 3,853,299 | 12/1974 | Kersel | 249/184 X |
| 3,934,968 | 1/1976 | Cicognani | 425/28 B |
| 3,989,439 | 11/1976 | Schmitzberger | 249/178 X |
| 3,990,673 | 11/1976 | Jones et al. | 249/185 X |
| 3,994,650 | 11/1976 | Nishimura et al. | 249/184 X |

FOREIGN PATENT DOCUMENTS

| | | | |
|---|---|---|---|
| 771553 | 11/1967 | Canada | 425/23 |
| 2041662 | 2/1972 | Fed. Rep. of Germany | 425/28 B |
| 1109465 | 10/1968 | United Kingdom | 425/32 |
| 1292929 | 10/1972 | United Kingdom | 425/28 B |

*Primary Examiner*—J. Howard Flint, Jr.
*Attorney, Agent, or Firm*—John W. Grant

[57] ABSTRACT

The invention is concerned with an apparatus and process for curing tread and track belts. The apparatus comprises a plurality of inner segments which fit together to form an outer generally cylindrical mold face surface of an inner cylinder along with means for retracting said plurality of inner segments towards the axis of said inner cylinder and means for heating said plurality of inner segments. Also part of the apparatus is a plurality of outer segments which fit together to form an inner generally cylindrical mold face surface of an outer cylinder, said outer cylinder being coaxial with said inner cylinder and of generally equal length therewith, along with means for retracting said plurality of outer segments away from the common axis of said cylinders and means for heating said plurality of outer segments. Finally the apparatus includes a pair of rings adapted to seal said inner cylinder to said outer cylinder at the ends thereof, at least one of said sealing rings being removable so that an uncured tread or track belt is positionable between said plurality of inner segments and said plurality of outer segments when said plurality of inner segments is retracted toward said common axis and said plurality of outer segments is retracted away from said common axis. The process is concerned with finish forming and curing an uncured tread or track belt in such an apparatus.

8 Claims, 8 Drawing Figures

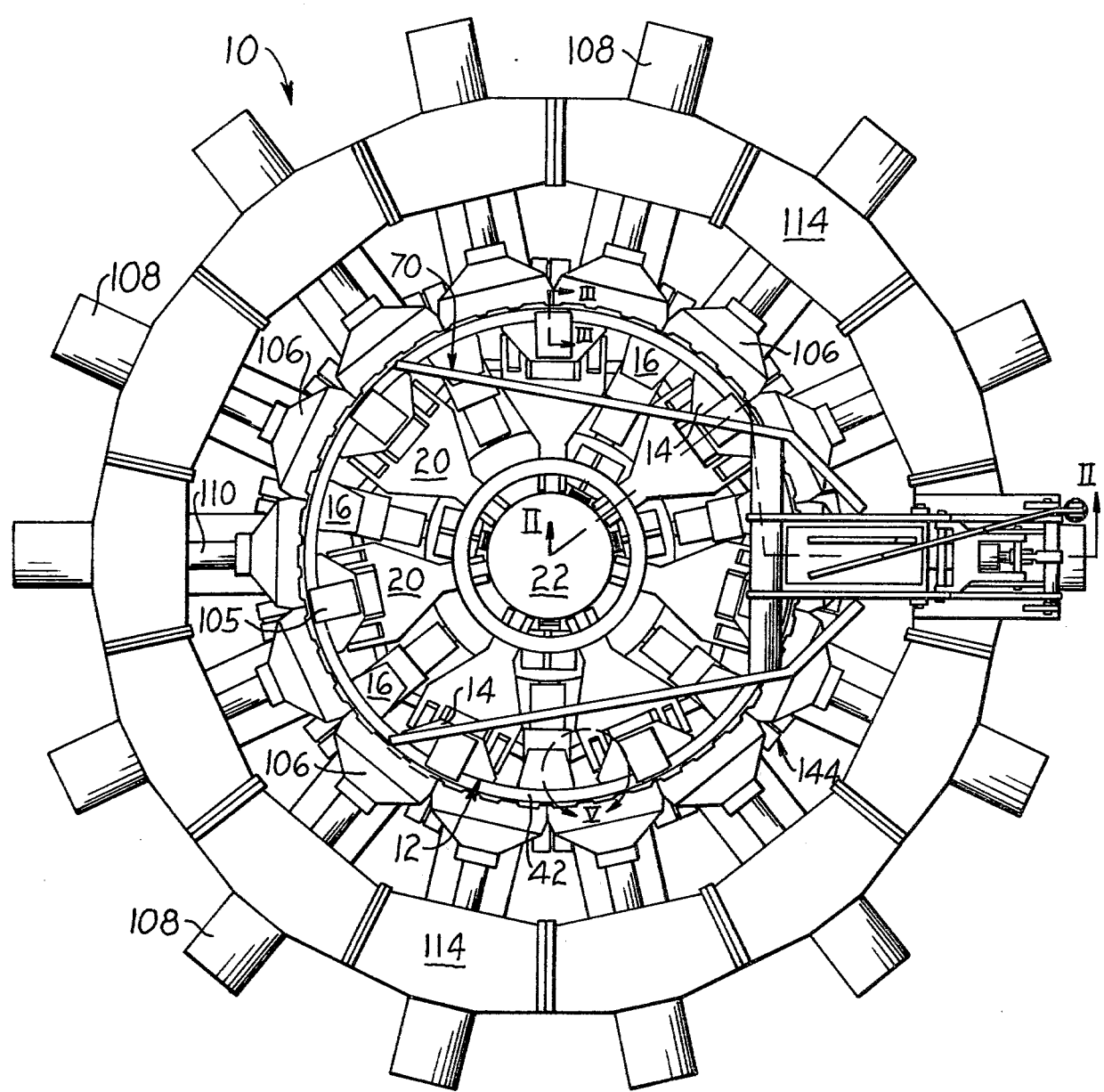

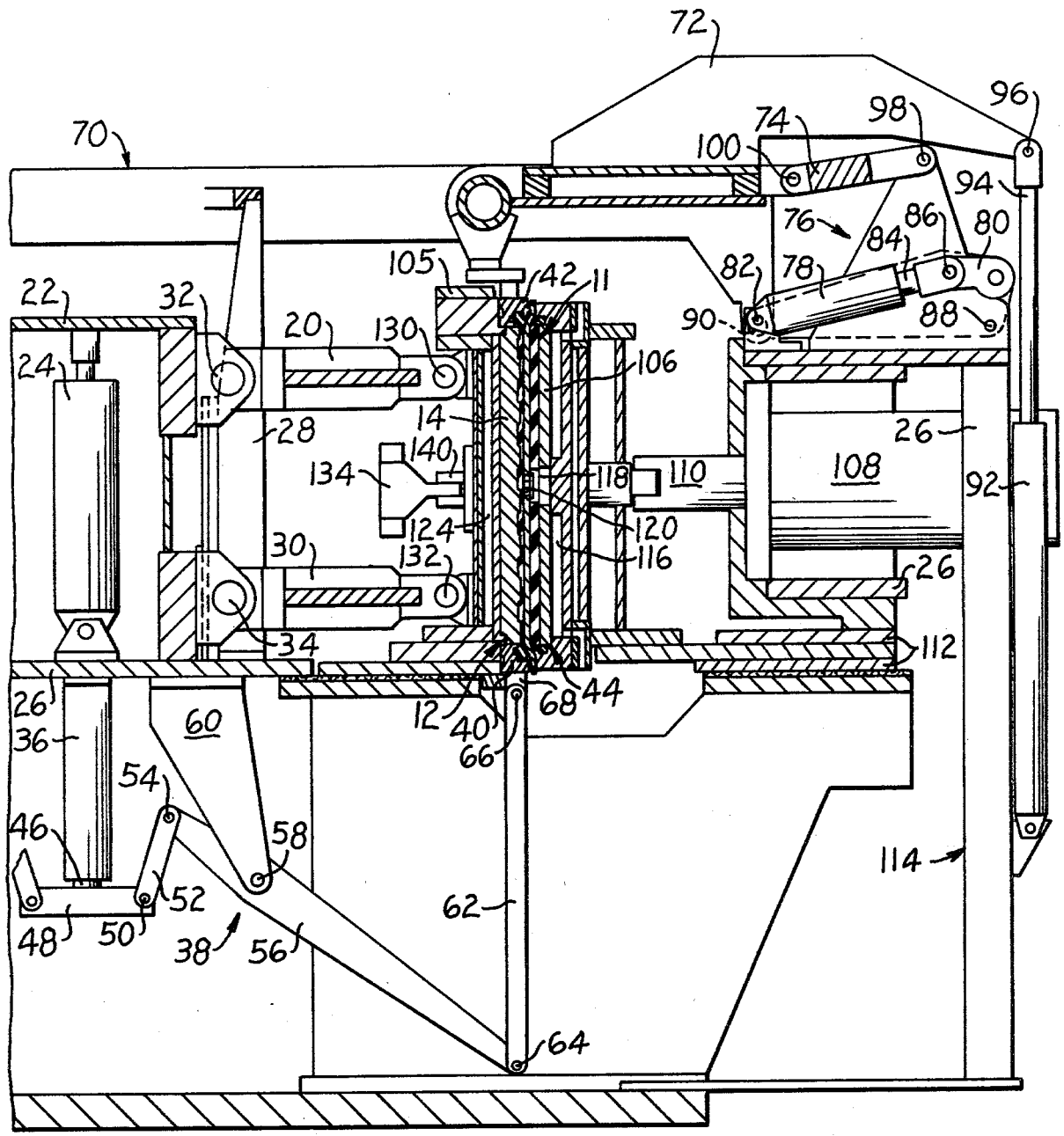

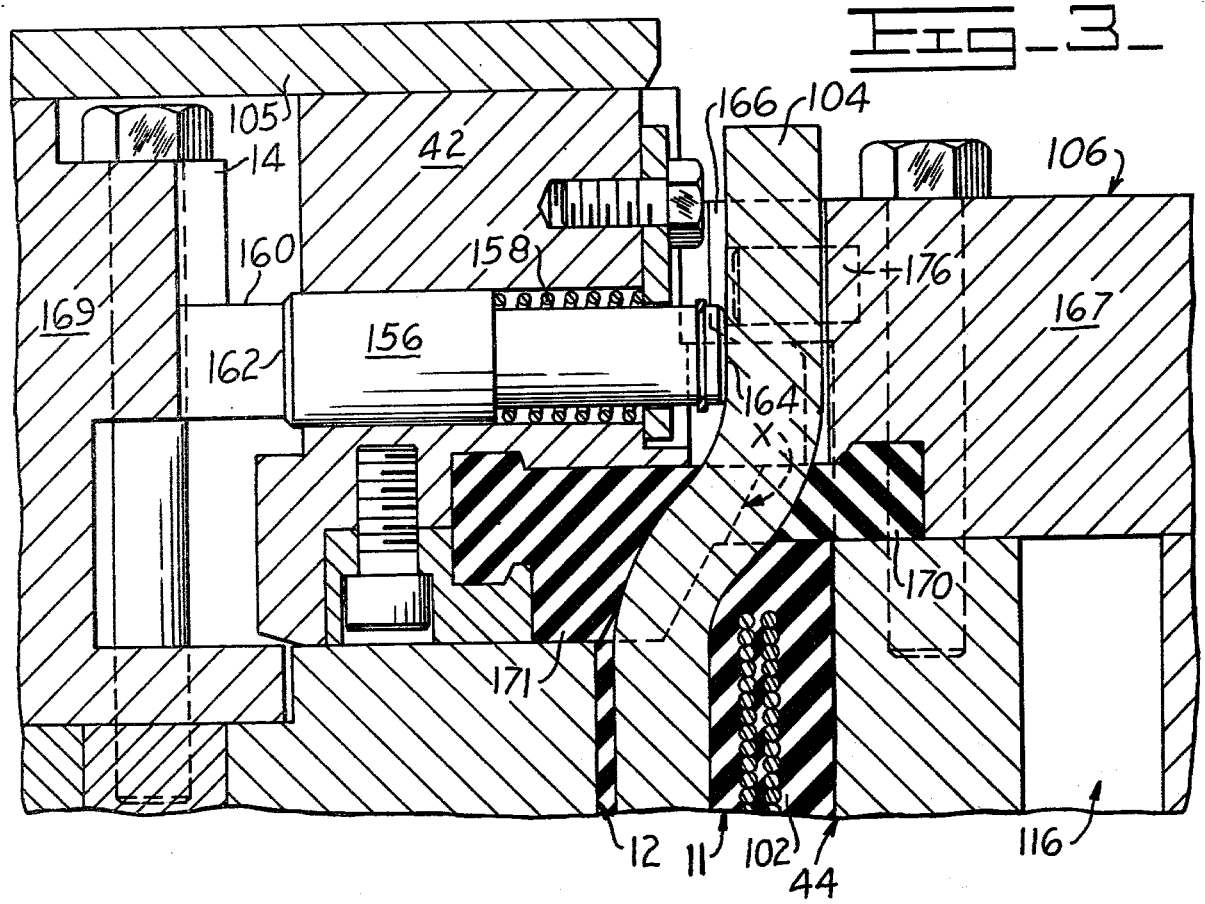
FIG_3_
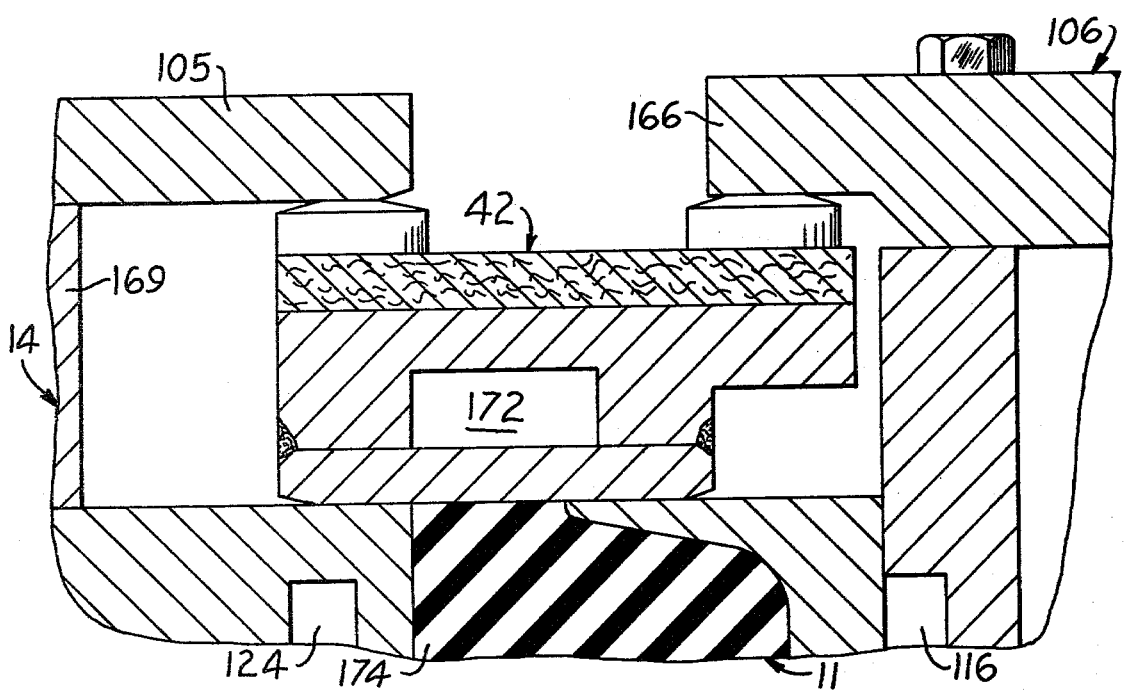
FIG_4_

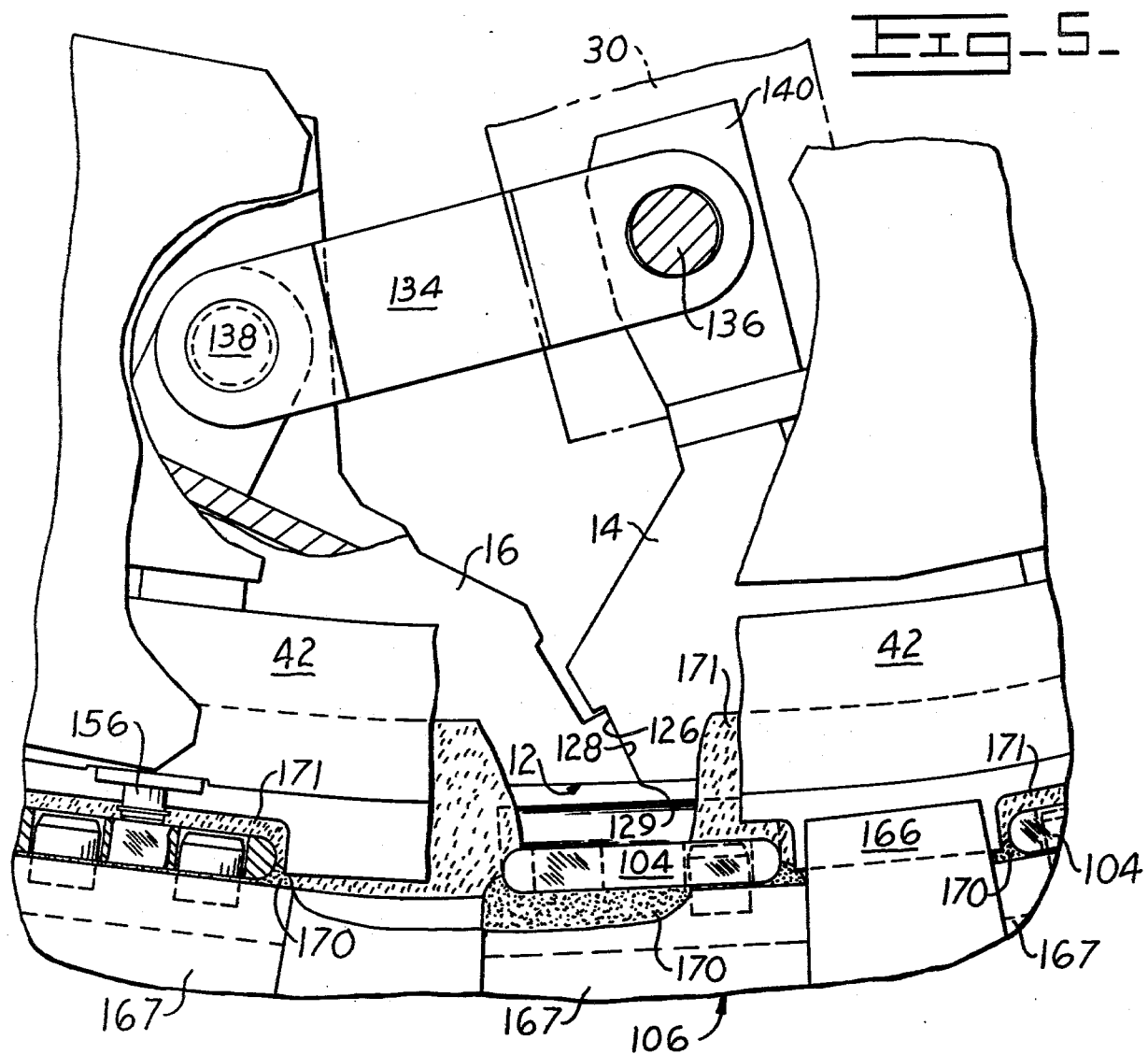
Fig_5_
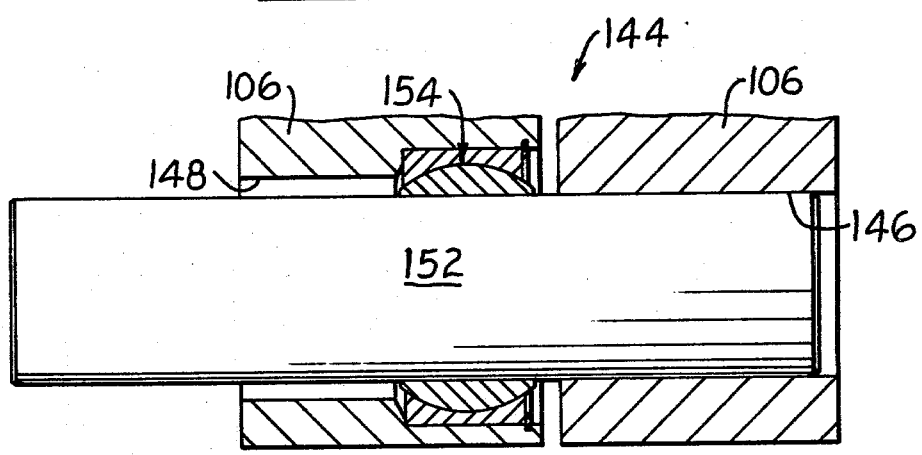
Fig_8_

Fig_6_
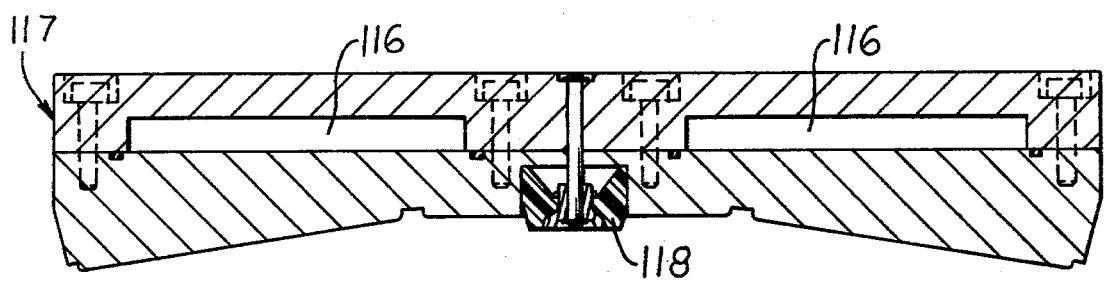
Fig_7_
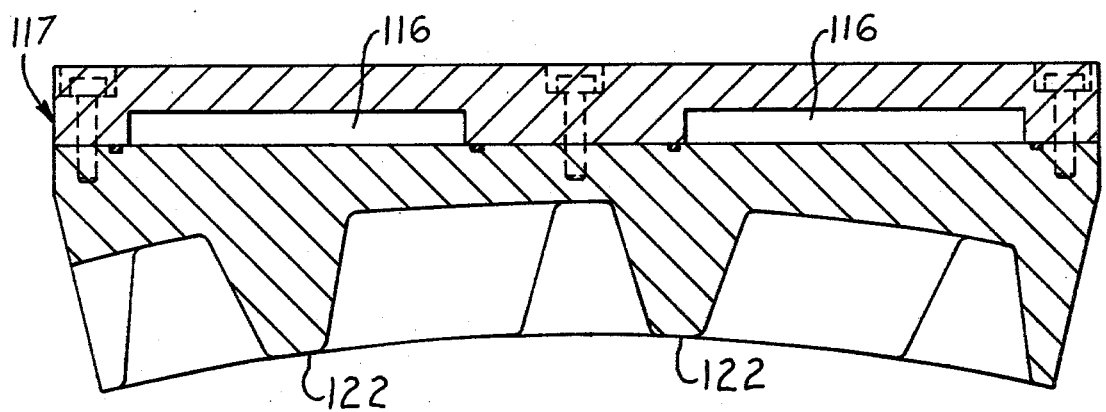

CURING MOLD FOR CURING REPLACEABLE TREAD AND TRACK BELTS

This is a continuation, of Ser. No. 895,887 filed Apr. 13, 1978, now abandoned, which was a continuation of Ser. No. 705,854 filed July 16, 1976, now abandoned.

BACKGROUND OF THE INVENTION

1. Field of the Invention

The invention is concerned with a molding apparatus for finish forming and curing tread and track belts with any desired tread pattern thereon.

2. Prior Art

In the making and curing of tire tread and track belts it has been common to wrap one or more layers of an uncured elastomeric material such as rubber or the like, with or without reinforcement such as metal belting, fabric and the like, about a cylindrical core. The cylindrical core is selected to have a diameter equal to the desired inner diameter of the eventually-cured belt. Thereafter, the cylindrical core, with the elastomeric layers and the like attached thereabout, is generally placed in the center of a cylindrical mold which comprises a larger cylinder, which larger cylinder can include mold faces with desired tread patterns on the interior surface thereof, the diameter of the larger cylinder is reduced until it properly contacts the material wrapped about the inner core and the entire apparatus is heated to cure the elastomer wrapped about the inner core. In such an apparatus, the outer mold face cylinder can, of course, be constantly heated if desired but it is not possible to heat the inner core about which the rubber is wrapped because premature curing might then take place. What results is somewhat uneven heating and hence uneven curing of the elastomer into the form of a tire tread or track belt. In particular, metal bands within the tire tread or track belt are often displaced from their desired positions when cured in a prior art mold with a relatively high temperature gradient between the inner core holding the tire tread or track belt and the outer cylinder of mold faces. Also, the time of curing is relatively long since the inner core, at least, must be heated after it has been placed in the mold. Further, the repeated heating and cooling of at least the inner core is costly in energy.

It would be highly desirable to provide an apparatus and a process for curing tire tread and track belts wherein the belts were uniformally and relatively quickly cured from both their inner and outer circumferences while heating costs were minimized and wherein metal bands and the like within the tire tread and track belts were kept uniformally distributed by the uniform curing thereof. The present invention provides just such an apparatus.

SUMMARY OF THE INVENTION

In one sense, the invention comprises an apparatus for curing tire tread and track belts. The apparatus comprises a plurality of inner segments which fit together to form an outer generally cylindrical mold face surface of an inner cylinder along with means for retracting said plurality of inner segments toward the axis of said inner cylinder, and means for heating said plurality of inner segments. Additionally, the apparatus includes a plurality of outer segments which fit together to form an inner generally cylindrical mold face surface of an outer cylinder, said outer cylinder being coaxial with said inner cylinder and of equal length therewith, along with means for retracting said plurality of outer segments away from the common axis of said cylinders and means for heating said plurality of outer segments. The apparatus further includes a pair of rings sealing said inner cylinder to said outer cylinder at the ends thereof, at least one of said sealing rings being removable so that an uncured tire tread or track belt is positionable between said plurality of inner segments and said plurality of outer segments when said plurality of inner segments is retracted toward said common axis and said plurality of outer segments is retracted away from said common axis.

BRIEF DESCRIPTION OF THE DRAWINGS

The invention will be better understood by reference to the drawings wherein like numbers denote like parts throughout and wherein:

FIG. 1 illustrates in top view an apparatus in accordance with the present invention for curing tire tread and track belts;

FIG. 2 is a view taken along the plane II—II of FIG. 1;

FIG. 3 illustrates a blown-up partial view taken along the plane III—III of FIG. 1 showing a track belt within the apparatus of the present invention;

FIG. 4 illustrates a blown-up partial view similar to that of FIG. 3 but with a tire tread belt within the apparatus of the present invention;

FIG. 5 illustrates a blown-up view taken in the area V of FIG. 1;

FIG. 6 illustrates a blown-up cross section of a facing member of an outer mold shoe for a track belt;

FIG. 7 illustrates a blown-up cross section of a facing member of an outer mold shoe for a tread belt; and FIG. 8 illustrates a blown-up detail relating to coordinated movement of the outer mold shoes for a tread or track belt.

DESCRIPTION OF THE PREFERRED EMBODIMENT

A tire tread and track belt curing apparatus 10 is shown generally in FIG. 1. FIGS. 2–8 show details in the structure of said preferred apparatus 10. The apparatus 10 includes an inner cylinder 12 formed partially of a first set of a plurality of inner segments 14. The first set of inner segments 14 each fit adjacent to one another, as shown most clearly in FIGS. 1 and 5, to form the inner cylinder 12. The inner cylinder 12 is further formed from a second set of a plurality of inner segments 16 which, in a manner which will be described in following, act as slave segments which are carried forward by the movement of the first set of inner segments 14, which segments 14 are powered. Thus, the first set of segments 14 and the second set of segments 16 fit together in alternating sequence to form the inner cylinder 12. As will be noted by reference to FIG. 5, it is necessary that the inner cylinder 12 be completely continuous. That is, gaps cannot be left between adjacent inner segments 14 and 16, and a proper mechanical arrangement must be provided to give an easy and smooth working mechanism whereby the first plurality of inner segments 14 and the second plurality of inner segments 16 can be easily retracted and advanced to form the continuous inner cylinder 12 in the manner described below. FIG. 1 does not show fully the mating of the inner segments 14 and 16 to form the continuous inner cylinder 12 because of crowding problems. FIG. 5 illustrates this feature in detail, as explained below.

Retraction of the first set of segments 14 proceeds via action of a first plurality of links 20 under the impetus of an elevation cylinder 22 which is moved upwardly or downwardly under the impetus of a first hydraulic cylinder 24. The first hydraulic cylinder 24 acts between a frame 26 and the elevation cylinder 22 to cause the elevation cylinder 22 to move upwardly or downwardly as guided by a centering slide 28 which forms a part of the frame 26. As will be most apparent from FIG. 2, there is a second plurality of links 30 aligned below the first plurality of links 20 in one-to-one relation therewith so as to provide an even pulling or pushing force upon the tops and bottoms of the first set of inner segments 14 and, as will be explained later, also upon the second set of inner segments 16. Each of the links 20 is pivoted at a plurality of first pivots 32 to the elevation cylinder 22. In the embodiment illustrated, the elevation cylinder 22 is at its lowermost position under the impetus of the hydraulic cylinder 24 which is substantially fully retracted and in that position each of the first plurality of links 20 and the second plurality of links 30 is substantially horizontal thus holding the first powered set of segments 14 in their outwardly expanded position to form the continuous inner cylinder 12.

Referring most particularly to FIG. 2, it will be noted that a second hydraulic cylinder 36 communicates between the frame 26 and a linkage 38 to provide a capability for moving upwardly and downwardly a lower seal ring 40. The lower seal ring 40 along with the inner cylinder 12, an upper seal ring 42 and an outer cylinder 44 together form the basic structural parts of the apparatus 10 of the present invention. It is clear that as the second hydraulic cylinder 36 expands, i.e. as a rod 46 thereof extends therefrom, a horizontal block 48 will be forced downwardly thereby pulling downwardly at a plurality of pivots 50 upon a plurality of links 52, which in turn pull downwardly at a plurality of pivots 54 upon a plurality of cranks 56, which are centrally pivoted at a plurality of pivots 58 to a plurality of stationary arms 60 which extends downwardly from and forms a part of the frame 26. The downward force exerted upon the pivots 54 results in an upward force exerted upon a plurality of links 62 at a plurality of pivots 64. This in turn leads to a force being upwardly applied upon the lower seal ring 40 via a plurality of pivots 66 and an intermediate lower seal ring support 68.

Referring most particularly to FIGS. 1 and 2, there is illustrated therein the upper seal ring 42 previously mentioned and means for lifting it upwardly and away from the inner cylinder 12 and the outer cylinder 44, and then tilting it to a generally vertical position. Briefly, the upper ring seal 42 is held by a lift fixture 70 which communicates via a bridge 72 and a link 74 with lift means 76, said lift means 76 comprising a third hydraulic cylinder 78 and a crank 80. The third hydraulic cylinder 78 is attached to a portion of the frame 26 radially external of the outer cylinder 44. Generally, the third hydraulic cylinder 78 is attached to the frame 26 at pivot 82. The third hydraulic cylinder 78 has a rod 84 forming a part thereof in the usual manner, and the rod 84 is attached pivotally to a pivot 86 to the crank 80. The crank 80 is pivotally attached to the frame 26 at a pivot 88 and is also attached to the lift fixture 70 at a pivot 90. As the hydraulic cylinder 78 extends, thus causing the rod 84 to move outwardly therefrom, the crank 80 is forced to pivot about the pivot 88 thereby causing an upward force upon the pivot 90 and an overall lifting force upon the lift fixture 70. At the same time, an auxiliary hydraulic cylinder 92 would have its rod 94 extending outwardly and acting via a pivot 96 to provide an overall vertically upward movement of the lift fixture 70. What results then is a direct vertical upward movement of the lift fixture 70 with the link 74 rotating about a pivot 98 that is attached to the frame 26 and about a pivot 100 that is attached to the lift fixture 70. After the lift fixture 70, and with it the upper seal ring 42, has been moved upward directly a sufficient distance to clear any obstructions, the lift fixture 70 is then rotated, as by retraction of the third hydraulic cylinder 78, and the auxiliary hydraulic cylinder 92 to move pivotally away from the top of the apparatus 10 and into a vertical position. It is important to the practice of the present invention, especially when a track belt 102 is being cured therein, that it be possible to lift the upper seal ring 42 directly upwardly so that it may clear the anchor plates 104 thereof, as is illustrated most clearly in FIG. 3. It will be apparent that the link 74 along with the crank 80 forms an unequal parallel arm linkage that is powered by the third hydraulic cylinder 78. The linkage is thus arranged so that the lift fixture 70 raises the upper seal ring 42 approximately straight up during the initial extension of the third hydraulic cylinder 78. As will be further noted by reference to FIGS. 1, 2, 3 and 4, a plurality of hold-down plates 105 extent from the first plurality of cylinders 14 radially outwardly to rest upon and hold down the upper seal ring 42 when it is in its down (sealing) position. This increases the overall structural integrity during belt curing.

Referring now once again most particularly to FIGS. 1 and 2, there is illustrated therein in some detail the structure and operation of the outer cylinder 44. Briefly, the outer cylinder 44 comprises a plurality of outer segments 106, each of which is retractable outwardly under the impetus of a respective one of a plurality of outer hydraulic cylinders 108, with each of the plurality of outer segments 106 being generally carried by a rod 110 of a respective one of the outer hydraulic cylinders 108, and with each of the segments of the plurality of outer segments 106 being slidingly held and positioned between a respective guide 112 supported by the frame 26. Thus, each of the third plurality of segments 106 is constrained to move horizontally. Each of the outer cylinders 108 is held by an outer ring portion 114 of the frame 26.

Referring now to FIGS. 6 and 7, there is illustrated therein embodiments of the plurality of outer segments 106 adapted respectively for forming track belts and tread belts. In each of these two embodiments, passages 116 are provided within the outer segments 106 to allow them to be kept at a desired curing temperature. Thus, the outer segments 106 can be preheated to a desired curing temperature for the belt which is to be cured within the apparatus 10. A plurality of facing members 117, which in some cases, as discussed in following, may define a tread pattern, are affixed removably as via bolts one to each of the outer segments 106.

The embodiment of FIG. 6 is concerned with a track belt and hence generally there will be no tread pattern therein other than a pattern for mating with a traction shoe bolted to the track belt. Instead, there will generally be a reinforced high temperature elastomeric cup 118 which acts as a plug to abut each central boss 120 in each anchor plate 104 of a track belt. The cup 118 is made of an elastomeric material so that it will deflect inwardly thus sealing and assuring a clean outer surface about the central boss 120 in the anchor plate 104. This facilitates later attachment of traction shoes to the belt after it is cured.

Turning now more particularly to FIG. 7, there is shown therein a cross section of one of the facing members 117 for a tread belt. With the tread belt, each of the facing members 117 will generally include a series of upraised ridges 122 defining a tread pattern. As with the embodiment in FIG. 6, the passages 116 serve as steam passages whereby the facing members 117 can be kept at a constant curing temperature.

The inner cylinder 12 is generally also heated by passing steam or the like into the interior of the first set of inner segments 14, and more particularly into a plurality of steam chambers 124 therein, illustrated in FIG. 2. Similar steam chambers can be provided within the second set of inner segments 16.

Reference to FIG. 5 will illustrate the interaction between the first set of inner segments 14 and the second set of inner segments 16 as driven by the first and second pluralities of links 20 and 30. The upper seal ring 42 is shown in FIG. 5 in partially cut-away form whereby the joining together of the first set of inner segments 14 with the second set of inner segments 16 to form the inner cylinder 12 as a complete cylinder is clearly illustrated. As will be noted from FIG. 5, each of the second or slave set of inner segments 16 is located in place by an edge 126 on the first set of inner segments 14 which mates with a ledge 128 on each of the second set of inner segments 16 to form a joint 129. Thus, any force exerted inwardly upon one or more of the second set of inner segments 16 causes the ledge 128 to be forced against the edge 126 and, since the edge 126 is poweredly held in place by the first and second pluralities of links 20 and 30 and the operation of the elevation cylinder 22, each of the second set of inner segments 16 is also held in placed in the same manner.

During retraction of the first set of inner segments 14 toward the elevating cylinder 22, as when the first hydraulic cylinder 24 extends whereby the first and second links 20 and 30 are pulled upwardly at the first plurality of pivots 32 and the second plurality of pivots 34, thus pulling the first set of inner segments 14 toward the elevation cylinder 22 at a third plurality of pivots 130 and a fourth plurality of pivots 132, respectively, the first set of inner segments 14 is linked to the second set of inner segments 16 by a plurality of slotted master/slave links 134 which are rotatably attached to the first set of inner segments 14 at a fifth plurality of pivots 136 and to the second set of inner segments 16 via a sixth plurality of pivots 138. The links 134 are slotted at the fifth plurality of pivots 136 to correct for possible machining variations. The fifth plurality of pivots 136 are attached to the first set of inner segments 14 at a plurality of arms 140, which extend therefrom toward the elevation cylinder 22 intermediate the first plurality of links 20 and the second plurality of links 30. As is clear, most particularly by reference to FIGS. 2 and 5, as the first plurality of links 20 and the second plurality of links 30 are caused to move upward under the impetus of the elevation cylinder 22 moving upward at the pivots 32, 34 respectively, the first set of inner segments 14 is forced to move inwardly as the first plurality of links 20 pivot about the third plurality of pivots 130 and the second plurality of links 30 pivot about the fourth plurality of pivots 132. This causes the plurality of master/slave links 134 to pivot about the fifth plurality of pivots 136 which in turn causes the sixth plurality of pivots 138, motivated by the plurality of master/slave links 134, to pull inwardly upon the second set of inner segments 16. Thus, first the first set of inner segments 14 pull away from defining the inner cylinder 12 and then the second set of inner segments 16 follow the first set of inner segments 14 away from forming the inner cylinder 12. In actual design, the link 134 and its connections to the first set of inner segments 14 and the second set of inner segments 16 is generally chosen so that the first set of inner segments 14 will travel away from the inner cylinder 12 approximately twice the distance that the second set of inner segments 16 will travel away from said inner cylinder 12. The design objective is to get inner cylinder 12 to retract far enough to allow lower ring 40 sufficient clearance to elevate. The 2:1 travel is a result.

Turning now to FIG. 8, there is illustrated therein means for assuring that each of the outer segments 106 travels outwardly away from defining the outer cylinder 44 at a generally equal rate even if one or more of the hydraulic cylinders 108 does not tend to operated at exactly the same speed as do all of the other cylinders 108. More particularly, FIG. 8 illustrates a segment alignment mechanism 144 comprising a first bore 146 within one of the segments 106 and a second bore 148 within the next adjacent of the segments 106. A shaft 152 fits in pressed fit within the first bore 146 and fits loosely within the second bore 148. Also within the second bore 148 is a spherical bearing 154 in which the shaft 152 slidingly fits. Thus, if one of the two adjacent shoes 106, shown in FIG. 8, tends to be moved by its respective hydraulic cylinder 108, at a different rate than the other shoe segment 106, the shaft 152 extending therefrom will exert pressure upon the slower moving adjacent segment 106 whereby they will be forced to travel at the same speed. The spherical bearing 154 in this case serves to allow for variations and to prevent binding and the like.

Adverting now once again to FIG. 3, there is illustrated therein a particular upper seal ring 42 and upper seal ring arrangement which is useful when a track belt 102, having anchor plates 104 thereon, is secured in the apparatus 10 of the invention. When track belts 102, which have anchor plates 104, are to be secured in the apparatus of the present invention, then a special problem arises of obtaining a good seal about the anchor plates 104 and maintaining that good seal during securing of the track belts 102. One advantageous apparatus for accomplishing this is shown in FIG. 3. In this apparatus, the first set of inner segments 14 or the second set of inner segments 16, as the case may be, and at times the joining of the first set of inner segments with the second set of inner segments, as shown for example in FIG. 5, meet to form the inner cylinder 12. The upper seal ring 42 adjacent the anchor plates 104 would then preferably include a pin 156 loaded by a spring 158 to protrude inwardly toward the elevation cylinder 22 until a pressure pad 160 contacts an inner end 162 thereof, and presses the pin 156 against the force of the spring 158 sufficiently so that an outer end 164 thereof contacts the anchor plate 104 and holds it in its proper radial position.

In order to maintain the apparatus 10 easily convertible for handling either track belts or tread belts, an end portion 166, 167 of each of the outer segments 106 is made detachably attachable thereto. Thus, one can convert from the configuration shown in FIG. 3 to the configuration shown in FIG. 4 by changing the upper seal ring 42 and by changing the end portions 166, 167 of each of the outer segments 106. End portion 167 useful with the track belt 102 is pinned by press fit pins 176 shown in FIG. 3 to the anchor plates 104 with two pins 176 each being used at the top and bottom of each anchor plate 104. The pins 176 are piloted in mounting holes to keep the anchor plates 104 in proper alignment during cure. A change in the upper seal ring 42 is necessary with respect to the first set of inner segments 14 and/or the second set of inner segments 16 for which purpose an end portion 168, 169 thereof is likewise made detachably attachable.

It should be noted that each of the structures shown in FIGS. 3 and 4 represent changes made not only at the upper seal ring 42 but also represent changes which are made at the lower seal ring 40, symmetrically thereto. A seal member 170 is provided which abuts the right hand curved portion of the anchor plates 104. The seal member 170 is clamped beneath the end portion 167. Another seal member 171 is held in the upper seal ring 42 and abuts the left hand curved portion of the anchor plates 104. At the edges of the plates 104 the two seal members 170 and 171 meet each other. Between the anchor plates 104 the seal member 171 extends to abut the facing members of the third plurality of segments 106. The seal members 170 and 171 contact at an angle as illustrated at X at the edges of the anchor plates 104. This allows the pressure of flowing uncured rubber of the belt 102 to aid in sealing the joint between the seal members 170 and 171. Once again, identical structure is needed for the lower seal ring 40. It should be noted further by reference to FIG. 4 that the upper seal ring 42, and for that matter the symmetrical lower seal ring 40, is heated as via passing steam through the steam chamber 172 therein.

Operation

In operation, with the first set of inner segments 14 and the second set of inner segments 16, as well as the plurality of outer segments 106, retracted away from forming the respective inner cylinder 12 and outer cylinder 44, the linkage 38 is activated by the second hydraulic cylinder 36 to cause the lower seal ring 40 to move upwardly. An uncured belt 11 is then placed upon the lower seal ring 40 and it is lowered into place through shortening of the second hydraulic cylinder 36 and concurrent movement of the linkage 38. Thereafter, the upper seal ring 42 rotates from the vertical to the horizontal and lowers into position under the impetus of the hydraulic cylinders 78 and 92. At this time, the belt 174, if a tread belt, or 102, if a track belt, is held between the lower seal ring 40 and the upper seal ring 42. The first set of inner segments 14 then begins moving outwardly and carries the second set of inner segments 16 outwardly with it. Inner cylinder 12 is formed completely before outer segments 106 begin to move inwardly. Outer segments 106 then move in until they are resisted by the uncured rubber. The hydraulic cylinders 108 are large enough to create a pressure, generally at least 200 psi and preferably about 350 psi in the uncured rubber between the inner cylinder 12 and the outer cylinder 44. This is an important aspect in making a good belt.

During this entire operation, the first set of inner segments 14, the second set of inner segments 16 and the plurality of outer segments 106 are maintained and preheated as by steam flowing through the passages 116 and 124 at a temperature suitable for curing the belt 102 or 174. The apparatus is then held in its closed position until the belt 102 or 174 has become cured. Thereafter, the outer plurality of segments 106 are withdrawn, the first set of inner segments 14, followed by the second set of inner segments 16, are withdrawn and the upper seal ring 42 is lifted from the belt 102 or 174 and the lower seal ring 40 is elevated through action of the second hydraulic cylinder 36 and the linkage 38 to push upwardly the now-cured belt 102 or 174 and place it in position for removal so that another uncured belt 102 or 174 can replace it.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

I claim:

1. In an apparatus for curing a tread or track belt, said apparatus having a plurality of inner segments movable between a first position at which the inner segments fit together to form a substantially inner cylindrical mold face surface and a second position at which the inner segments are moved radially inwardly toward a longitudinal axis of said cylindrical mold face surface, said plurality of inner segments including a first set of inner segments alternatively placed between the segments of a second set of inner segments, the improvement comprising:

means for moving the segments of the first set of inner segments between the first and second positions;

means for moving the segments of the second set of inner segments between the first and second position in response to movement of the segments of the first set of inner segments;

a plurality of outer segments movable between a first position at which the outer segments fit together to form a second mold face surface and a second position at which the outer segments are moved radially outwardly;

means for moving the outer segments between the first and second positions;

a seal ring movable between a first position at which said seal ring is in sealing contact with the ends of the inner and outer segments at the first position of the inner and outer segments and a second position at which said seal ring is positioned intermediate the ends of the inner and outer segments at the second position of said inner and outer segments; and means for moving the seal ring between said first and second positions.

2. The apparatus of claim 1 including a frame, said means for moving the seal ring between said first and second positions includes a crank centrally pivoted to said frame, a link connected to one end of said crank and to said seal ring, and a hydraulic cylinder connected to said frame and to the other end of said crank.

3. In an apparatus for curing a tread or track belt, said apparatus having a plurality of inner segments movable between a first position at which the inner segments fit together to form a substantially continuous inner cylindrical mold face surface and a second position at which the inner segments are moved radially inwardly toward a longitudinal axis of said cylindrical mold face surface, said plurality of inner segments including a first set of inner segments alternatively placed between the segments of a second set of inner segments, the improvement comprising:

means for moving the segments of the first set of inner segments between the first and second positions;

means for moving the segments of the second set of inner segments between the first and second position in response to movement of the segments of the first set of inner segments;

a plurality of outer segments movable between a first position at which the outer segments fit together to form a second mold face surface and a second position at which the outer segments are moved radially outwardly;

means for moving the outer segments between the first and second positions; and means for linking adjacent outer segments to one another and moving the outer segments at substantially the same rate between the first and second positions.

4. The apparatus of claim 3 wherein said means for linking adjacent outer segments to one another includes a first bore within one of said outer segments, a second bore within the next adjacent outer segment, and a shaft fitted within the first bore and loosely extending into the second bore.

5. The apparatus of claim 4 including a spherical bearing positioned within said second bore, said shaft slidingly extending into said spherical bearing.

6. In an apparatus for curing a tread or track belt, said apparatus having a plurality of inner segments movable between a first position at which the inner segments fit together to form a substantially continuous inner cylindrical mold face surface and a second position at which the inner segments are moved radially inwardly toward a longitudinally axis of said cylindrical mold face surface, said plurality of inner segments including a first set of inner segments alternatively placed between the segments of a second set of inner segments, the improvement comprising:

means for moving the segments of the first set of inner segments between the first and second positions;

means for moving the segments of the second set of inner segments between the first and second position in response to movement of the segments of the first set of inner segments;

a plurality of outer segments movable between a first position at which the outer segments fit together to form a second mold face surface and a second position at which the outer segments are moved radially outwardly;

means for moving the outer segments between the first and second positions;

a seal ring movable between a first position at which the seal ring is in sealing contact with an end of the inner and outer segments at the first positions of the segments and a second position at which the seal ring is removed from and tilted relative to the inner and outer segments; and means for moving said seal ring between said first and second positions, the initial movement of the seal ring from the first position to the second position being generally along said longitudinal axis for a preselected distance.

7. The appatatus of claim 6 including a second seal ring movable between a first position at which said second seal ring is in sealing contact with the other end of the inner and outer segments at the first position of the segments and a second position at which said second seal ring is positioned intermediate the ends of the inner and outer segments at the second position of said segments, and means for moving the second seal ring between said first and second positions.

8. The apparatus of claim 7 including means for linking adjacent outer segments to one another and moving the outer segments at substantially the same rate between the first and second positions.

* * * * *